United States Patent [19]

Kumakura

[11] Patent Number: 4,622,682
[45] Date of Patent: Nov. 11, 1986

[54] ARQ TRANSMISSION SYSTEM

[75] Inventor: Kazumasa Kumakura, Sagamihara, Japan

[73] Assignee: Ricoh Company, Ltd., Japan

[21] Appl. No.: 593,603

[22] Filed: Mar. 26, 1984

[30] Foreign Application Priority Data

Mar. 25, 1983 [JP] Japan .................................. 58-48726

[51] Int. Cl.$^4$ ............................................ H04L 1/16
[52] U.S. Cl. ...................................... 375/58; 371/32; 178/69 R
[58] Field of Search ................. 375/37, 40, 58; 371/2, 371/30, 32; 370/82, 83; 358/256, 263, 257; 178/63 R, 63 E, 69 R, 69 M, 23 A; 455/63, 68, 69

[56] References Cited
U.S. PATENT DOCUMENTS

| 3,878,333 | 4/1975 | Shimizu | 371/32 |
| 3,879,577 | 4/1975 | Progler | 371/32 |
| 4,149,142 | 4/1979 | Kageyama et al. | 371/32 |

Primary Examiner—Benedict V. Safourek
Attorney, Agent, or Firm—Guy W. Shoup

[57] ABSTRACT

A facsimile communication system equipped with an ARQ function for transmitting data in the form of a block between a transmitter and a receiver through a transmission route having a relatively large time delay, such as a submarine cable and communications satellite, is provided. In the system, prior to transmission of image data, a time delay in transmission of data through a selected transmission route is measured and the number of bits of data block is determined in accordance with the thus measured time delay.

6 Claims, 5 Drawing Figures

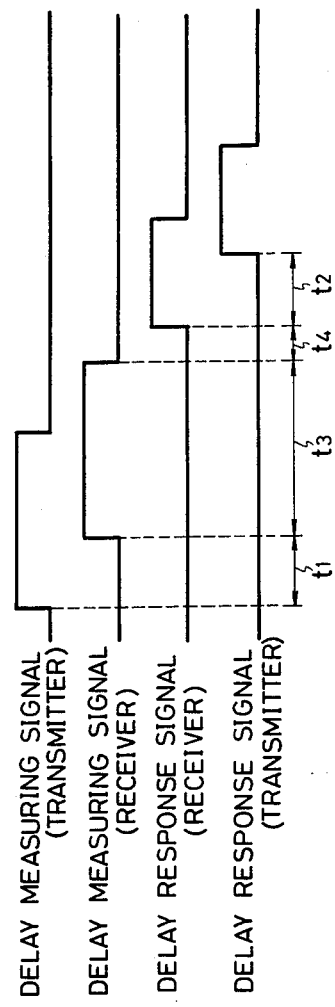

ARQ TRANSMISSION SYSTEM

BACKGROUND OF THE INVENTION

1. Field of the Invention

This invention relates to a data transmission system and particularly to a facsimile transmission system in which a receiver can send a request for retransmission of data in the form of a block upon detection of an error to the transmitter.

2. Description of the Prior Art

As well known in the art, in a facsimile communication system, in a protocol procedure prior to transmission of messages or image data, the transmission speed or rate of MODEM is selected to carry out MODEM training, and if successful, transmission of image data at the selected transmission speed is carried out. However, even if the MODEM training has been carried out successfully, it does not insure the transmission of image data in an excellent condition at all times. If the condition of transmission line becomes poor during a transmission operation, image data may be partly lost during transmission thereby hindering to transmit image data in a complete form to a receiver.

In order to cope with the above-described inconveniences, the ARQ method has been applied to a facsimile transmission system. In this case, image data is divided into blocks, each containing a predetermined number of bits, prior to transmission to a receiver. And, to each block data is added a start flag, stop flag, command (including block number) and CRC code so that the image data is formulated into a predetermined frame. Thus, the image data is transmitted from a transmitter to a receiver block by block. At the receiver, each block data is examined upon receipt and if it is found that there is abnormality in CRC code, the block number differs from the one expected at the receiver, and/or the flag is destroyed, then the receiver automatically sends a signal for requesting retransmission of block data to the transmitter.

In such a scheme, the same image data is repetitively transmitted from the transmitter to the receiver whenever malfunction occurs during transmission. Thus, it is insured that the image data received at the receiver is always normal without loss and alterations, thereby allowing the receiver to receive an image which is faithful to an original image transmitted from the transmitter at all times. In a transmission system equipped with such an ARQ function, the transmitter must receive a response signal from the receiver while the transmitter is transmitting the next following block data. Therefore, the above-described ARQ function becomes inoperative when data must be transmitted through a transmission route having a relatively large delay in transmission. For example, this happens when a submarine cable or communications satellite is involved. When a submarine cable is used, there is a transmission delay of approximately 50 milliseconds in one way; whereas, when a communications satellite is used, there is similarly a transmission delay of approximately 300 milliseconds. In such a case, since there is a relatively large delay in transmission, there is a chance that the transmitter fails to receive a response signal from the receiver as to the last preceding block data which has been just transmitted while the transmitter is transmitting the next following block data.

SUMMARY OF THE INVENTION

It is therefore a primary object of the present invention to provide an improved data transmission system.

Another object of the present invention is to provide a data transmission system provided with an ARQ function which may remain operative even if there is a relatively large delay in transmission.

A further object of the present invention is to provide a facsimile transmission system capable of transmitting image data without loss and/or alterations.

A still further object of the present invention is to provide an ARQ equipped facsimile communication system which allows to transmit image data through a transmission route having a relatively large transmission delay, such as a submarine cable and communications satellite.

Other objects, advantages and novel features of the present invention will become apparent from the following detailed description of the invention when considered in conjunction with the accompanying drawings.

BRIEF DESCRIPTION OF THE DRAWINGS

FIGS. 2(a) through 2(d) are timing charts showing several wave forms which are useful for understanding the operation of the system shown in FIG. 1.

DESCRIPTION OF THE PREFERRED EMBODIMENT

Figure 1:
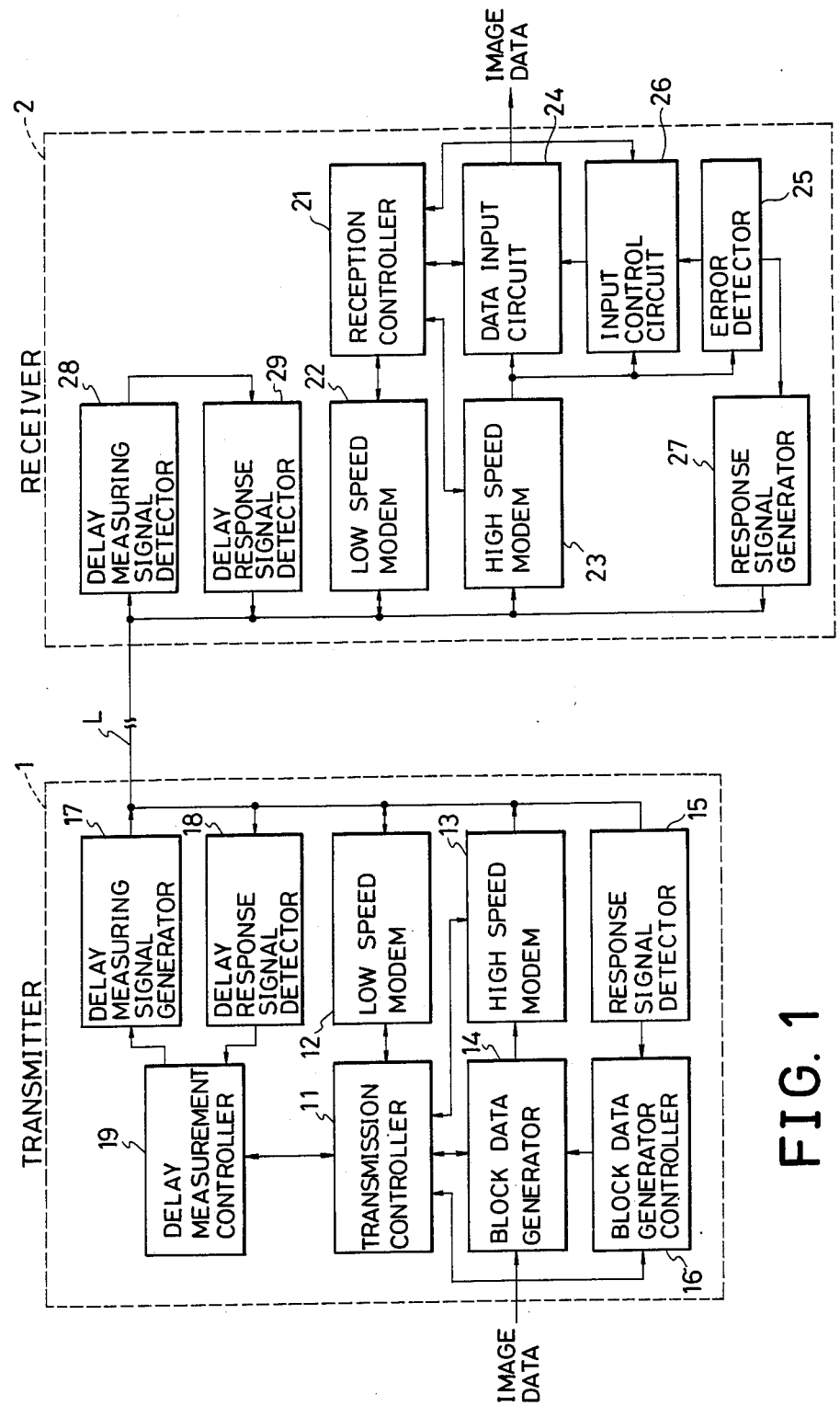
FIG. 1 is a block diagram showing the overall structure of an ARQ-equipped facsimile communication system constructed in accordance with one embodiment of the present invention.

Referring now to FIG. 1, there is shown an ARQ-equipped facsimile communication system constructed in accordance with one embodiment of the present invention. As shown, the system includes a transmitter 1, a receiver 2 and a transmission line L extending between the transmitter 1 and the receiver 2. The transmitter 1 includes a transmission controller 11 which carries out the overall transmission control of transmitter 1, a low speed MODEM 12 for use with various control signals and a high speed MODEM 13 for use with image data to be transmitted. Similarly, the receiver 2 includes a reception controller 21, a low speed MODEM 22 and a high speed MODEM 23.

The transmitter 1 further includes a block data generator 14 as connected to the transmission controller 11 and high speed MODEM 13. The block data generator 14 receives compressed image data line by line and stores the data temporarily, and, then, divides the data into blocks each having a predetermined number of bits set by the transmission controller 11. Then a start flag, a stop flag, a control bit and a CRC code are added to each of the block data thus formed and the block data added with additional information are supplied to the high speed MODEM 13.

The transmitter 1 also includes a response signal detector 15 connected to the transmission line L for detecting a reception response signal indicating the safe receipt of a block of data by the receiver and a block data generator controller 16 for controlling the operation of the block data generator 14 such that the next following block of data is transmitted if the received response signal indicates ACK (acknowledgment) and, on the other hand, the same block of data is retransmitted if the received response signal indicates NACK (non-acknowledgment). Moreover, in response to a command supplied from the transmission controller 11, the block data generator controller 16 also functions to stop input of image data into the block data generator 14.

Also provided in the transmitter 1 is a delay measuring signal generator 17 connected to supply a delay measuring signal for measuring a time delay of a transmission route to the transmission line L. The transmitter 1 also includes a delay response signal detector 18 for detecting a delay response signal transmitted from the receiver 2 in response to the delay measuring signal and a delay measurement controller 19 which activates the delay measuring signal generator 17 and receives a detection signal from the delay response signal detector 18 to measure a time delay in transmitting data between the transmitter 1 and the receiver 2 through the transmission line L.

On the other hand, the receiver 2 includes a data input circuit 24 which decomposes the frame of received data and to store the resulting image data and an error detector 25 which calculates a CRC code on the basis of the received data and to compare the calculated CRC code with the transmitter-added CRC code of the received data, whereby the error detector 25 supplies as its output an ACK (acknowledgment) detection signal if agreement is found between the two CRC codes or a NACK (non-acknowledgment) detection signal if no agreement is found. There is also provided an input control circuit 26 as connected between the data input circuit 24 and the error detector 25. The input control circuit 26 controls the operation of the data input circuit 24 such that the data input circuit 24 supplies image data to the next following stage only when the error detector 25 supplies an ACK detection signal and there is an agreement between the block number in the control frame and the block number expected at the receiver 2. Also provided is a response signal generator 27 which supplies an appropriate response signal to the transmission line L depending upon the contents of a detection signal supplied from the error detector 25.

The receiver 2 also includes a delay measuring signal detector 28 for detecting the delay measuring signal transmitted from the transmitter 1 through the transmission line L and a delay response signal detector 29 which supplies a delay response signal to the line L in response to a detection output supplied from the delay measuring signal detector 28.

It is to be noted that the above-described response signals are signals in a frequency band, e.g., 330 Hz or 3,300 Hz, which is different from the frequency band in transmitting facsimile signals. Thus, even during transmission of image data, image data and response signals may be transmitted at the same time using the same transmission line L.

When a facsimile communication is to be carried out with the above-described structure, prior to entering into a predetermined communication control procedure, the transmission controller 11 of transmitter 1 supplies a command signal to the delay measurement controller 19 to activate the delay measuring signal generator 17. Thus, a delay measuring signal shown in FIG. 2(a) is supplied to the transmission line L and then after elapsing a time period $t_1$ it is detected by the delay measuring signal detector 28 of the receiver 2, as indicated by FIG. 2(b). At the falling end of the delay measuring signal, the delay measuring signal detector 28 apprises the delay response signal detector 29 of the fact that the delay measuring signal has been detected. And, thus, the delay response signal detector 29 supplies a delay response signal to the transmission line L. This delay response signal is detected by the delay response signal detector 18 of the transmitter 1, as indicated by FIG. 2(d), and the delay response signal detector 18 apprises the delay measurement controller 19 of the fact that the delay response signal has been detected.

Now, time t from activation of the delay measurement controller 19 by the delay measuring signal generator 17 to detection of the delay response signal by the delay response signal detector 18 is a sum of transmission delay time $t_1$, $t_2$, signal width $t_3$ of delay measuring signal and processing time $t_4$ at the receiver 2. Among these various time periods, signal width $t_3$ is a previously determined value and the processing time $t_4$ is also a predetermined value, so that the total time delay $T_d$ may be expressed as follows:

$T_d = t - (t_3 + t_4)$

Accordingly, after measuring time t, the delay measurement controller 19 carries out the above-described calculation to obtain a total delay time $T_d$, which is then output to the transmission controller 11. In response to the received total delay time $T_d$, the transmission controller 11 determines the number n of bits in a block of data, for example, according to the following table, which is then supplied to the block data generator 14.

| Total Delay Time | No. of Bits |
| --- | --- |
| $T_b < T_s/2$ | N |
| $T_s/2 \leq T_b < T_s$ | 2N |
| $T_s \leq T_b < 3T_s/2$ | 3N |
| $3T_s/2 \leq T_b < 2T_s$ | 4N |

In the above table, N is an integer indicating a reference length of a block of data, e.g., 2,048, and $T_s$ is time required to transmit the data having N number of bits.

After determining number N of bits of a block of data in this manner, the transmitter 1 enters into a predetermined communication procedure to carry out transmission of image data as well known for one skilled in the art.

It is to be noted that a relation between time $T_d$ and number N of bits should not be limited only to the above-described table. What is critical here is that the system allows the transmitter to receive a response signal supplied from the receiver while the transmitter is transmitting the next following block of data. It is also to be noted that the measurement of delay time $T_3$ may also be carried out during the facsimile communication procedure. In this case, use may be made of optional signals in the procedure, such as NSS as a delay measuring signal and CFR as a delay response signal. It should also be noted that the above-described embodiment is a case in which the present invention is applied to a facsimile communication system; however, the present invention may also be applied to other data communication systems employing the ARQ function.

As described above, in accordance with the present invention, the transmission time delay is first measured and the number of bits of a block of data to be transmitted is determined depending upon the measured time delay, so that the ARQ function may be maintained operative even if there is a relatively large time delay in a selected communication route.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A communication system having an ARQ function for transmitting data between a transmitter and a receiver in which said receiver supplies a response signal to said transmitter every time said receiver receives a block of data having a predetermined number of bits from said transmitter, said system comprising:
    delay measuring means for measuring a time delay in transmitting a signal between said transmitter and said receiver through a selected transmission route;
    means for generating and transmitting said block of data to be transmitted from said transmitter to said receiver; and
    controlling means responsive to said time delay measured by said delay measuring means for controlling said means for generating and transmitting such that said number of bits of said block of data is varyingly set in accordance with said time delay measured by said delay measuring means wherein said response signal from said receiver is different in frequency from said data transmitted by said transmitter.

2. The system of claim 1 wherein said number of bits of said block of data is increased by said controlling means as said time delay increases.

3. The system of claim 1 wherein said number of bits of said block of data is varied as an integer multiple of a reference number in accordance with a magnitude of said time delay measured by said delay measuring means.

4. The system of claim 1 wherein said system is a facsimile communication system which includes a delay causing element causing a relatively large delay in data transmission in a communication route between said transmitter and said receiver.

5. The system of claim 4 wherein said delay causing element is a submarine cable or a communications satellite.

6. The system of claim 4 wherein said system is equipped with an ARQ function.

* * * * *